United States Patent [19]

Tsunoda et al.

[11] Patent Number: 4,976,941
[45] Date of Patent: Dec. 11, 1990

[54] PROCESS FOR OXIDIZING CARBON MONOXIDE IN EXHAUST GAS FROM A SINTERING FURNACE

[75] Inventors: Takeo Tsunoda; Setsu Takeo; Tatsuya Nobusawa; Norihide Enomoto; Hiroyasu Takahashi; Minoru Watanabe; Yutaka Sasaki; Kunihiro Tanaka, all of Chiba, Japan

[73] Assignee: Kawasaki Steel Corporation, Kobe, Japan

[21] Appl. No.: 368,984

[22] Filed: Jun. 15, 1989

Related U.S. Application Data

[63] Continuation of Ser. No. 166,409, Mar. 22, 1988, abandoned, which is a continuation of Ser. No. 814,733, Dec. 30, 1985, abandoned.

[30] Foreign Application Priority Data

Dec. 29, 1984 [JP] Japan .................. 59-278809

[51] Int. Cl.$^5$ .................................................. B01D 53/36
[52] U.S. Cl. ................................................ 423/247; 502/252
[58] Field of Search .............. 502/252, 262; 423/247, 423/213.5, 242 R, 242 A, 243, 244 R, 244 A

[56] References Cited

U.S. PATENT DOCUMENTS

| | | | |
|---|---|---|---|
| 2,750,329 | 6/1956 | Barrett et al. ............... | 502/252 |
| 3,378,334 | 4/1968 | Bloch ............................. | 423/213.5 |
| 4,200,552 | 4/1980 | Noguchi et al. ............. | 423/213.5 |
| 4,231,900 | 11/1980 | Kato et al. .................. | 423/213.5 |
| 4,369,132 | 1/1983 | Kinoshita et al. ........... | 423/213.5 |
| 4,483,691 | 11/1984 | McShea, III et al. ....... | 48/215 |
| 4,552,733 | 11/1985 | Thompson et al. .......... | 423/213.5 |
| 4,757,045 | 7/1988 | Turner et al. ................ | 423/213.5 |

FOREIGN PATENT DOCUMENTS

| | | | |
|---|---|---|---|
| 2241583 | 3/1973 | Fed. Rep. of Germany ... | 423/213.5 |
| 9090294 | 8/1974 | Japan ............................. | 423/213.5 |
| 50-95188 | 7/1975 | Japan . | |
| 1105994 | 9/1976 | Japan ............................. | 502/262 |
| 54-1289 | 1/1979 | Japan . | |
| 55-41812 | 10/1980 | Japan . | |
| 56-121643 | 9/1981 | Japan . | |
| 190239 | 9/1985 | Japan ............................. | 502/252 |
| 60-238153 | 11/1985 | Japan . | |
| 61-15740 | 1/1986 | Japan . | |
| 971994 | 10/1964 | United Kingdom ............ | 423/213.5 |
| 1330842 | 9/1973 | United Kingdom ............ | 423/213.5 |

OTHER PUBLICATIONS

Brunelle et al., "The Deactivation of Automotive Post-Combustion Catalysts by Lead from Gasoline", *Catalyst Deactivation*. Elsevier Scientific Publ. Co. 1980, pp. 233-34, 246-50.

*Primary Examiner*—Jeffrey E. Russel
*Attorney, Agent, or Firm*—Young & Thompson

[57] ABSTRACT

A catalyst in the form of a honeycomb structured cordierite carrier having platinum supported in a loading weight of at least 0.20 mg per square centimeter of the apparent outer surface area of the catalyst is effective in a process for oxidizing CO in exhaust gas from a sintering furance wherein it maintains high CO oxidation efficiency for a longer period of time, requiring less frequent regeneration and less power consumption.

2 Claims, 8 Drawing Sheets

PROCESS FOR OXIDIZING CARBON MONOXIDE IN EXHAUST GAS FROM A SINTERING FURNACE

This application is a continuation of application Ser. No. 07/166,409, filed Mar. 22, 1988, abandoned, which is a continuation of application Ser. No. 06/814,733, filed Dec. 30, 1985, now abandoned.

BACKGROUND OF THE INVENTION

This invention relates to a process useful for oxidizing combustible components such as carbon monoxide generated during manufacture of sintered minerals.

In general, unburned carbon monoxide or CO generated during manufacture of sintered minerals, for example, is one of sources from which oxidative heat is to be recovered. The unburned CO cannot be oxidized at low temperatures because of its low concentration, and it is thus usually oxidized with the use of suitable catalysts.

However, exhaust gases from a sintering furnace generally contain a very minor proportion of poisoning substances which undesirably causes catalysts to be deteriorated. The catalyst deterioration used herein is represented by the rate of reduction in percent CO oxidation during passage of actual gases. The catalyst deterioration is reversible. To regenerate the catalyst, we devised regenerating systems as shown in FIG. 1 or FIG. 2 and filed patent applications, Japanese Patent Application Nos. 59-135188 and 5993773. The systems shown in FIGS. 1 and 2 are for treating exhaust gas 1 from a sintering furnace (not shown) after desulfuring and include a CO oxidation catalyst layer 2 or layers 3a, 3b, 3a' and 3b', dampers 4, 4a, 5, and 5a, rotary shafts with drive 6 and 6a, a denitrating reactor 7, or denitrating reactors 7a and 7b a heating furnace 8, a blower 9, a heat exchanger 10, and a stack 11.

The system of FIG. 1 is designed such that the gas flow is reversed when the catalyst is deteriorated to a given extent, and the system of FIG. 2 is designed such that the catalyst layers are reversed via a damper-like mechanism, both for the purpose of regenerating the catalyst.

These systems are required to reverse the catalyst layers or gas flow direction every one hour when they are operated at a catalyst layer inlet gas temperature of 390° C. and a gas space velocity of 180,000 $hr^{-1}$ because of the presence of trace amounts of poisoning substances in the exhaust gas to be treated from a sintering furnace.

There remains the need for further improving the above-proposed systems, particularly reducing the frequency of catalyst regeneration and the power consumption of an associated blower. These are the objects of the present invention.

More illustratively, an actual industrial installation requires control of the opening of dampers or the number of revolutions of the blower in the system in view of flow rate variation resulting from pressure fluctuation in the system during regeneration of the CO oxidizing catalyst as well as control of molar ratio of $NH_3/NO_x$ in view of the official prescribed limit of $NO_x$. For positive operation and maintenance of an actual denitrating equipment, it is desired to reduce the frequency of catalyst regeneration.

The above-proposed systems can reduce the power consumption when applied to an actual industrial installation and the present invention provides a further reduction in power consumption. The present invention is intended to achieve reductions in frequency of catalyst regeneration and power consumption by optimizing the loading weight of platinum on a catalyst to thereby optimize the initial activity of the catalyst under sintering furnace exhaust gas conditions and to decelerate the rate of deterioration of the catalyst.

Generally, the loading weight of active ingredients in catalyst is determined in relation to the initial activity of the catalyst in most cases, and correlated to the rate of deterioration of catalyst in few cases.

As to the catalysts for oxidizing CO in exhaust gases from a sintering furnace, the loading weight of active ingredients is specified and described in Japanese Patent Publication No. 55-41812 and Japanese Patent Application Kokai Nos. 56-121643 and 54-1289. However, these noble metal loading weights are not determined in consideration of the rate of deterioration of the catalysts, and the specified or described loading weights are significantly lower than in the present invention.

More particularly, Japanese Patent Publication No. 55-41812 specifies the platinum loading weight to the wide range of from 0.0001 to 0.1% by weight on a carrier of metal material. The example of this Publication reports a platinum loading of 0.01% by weight, which is presumed to be 0.04 mg per square centimeter of the apparent outer surface area of the catalyst.

The term platinum loading weight per apparent outer surface area of catalyst is a platinum loading weight per geometric surface area of catalyst.

Japanese Patent Application Kokai No. 56-121643 discloses the optimum platinum loading weight of about 0.5% by weight for a catalyst comprising a carrier of $TiO_2$-$SiO_2$ having platinum uniformly dispersed throughout the carrier. The platinum loading weight in the final catalyst is presumed to be 0.42% by weight based on the entire catalyst bulk and 0.13 mg per square centimeter of the apparent outer surface area of the catalyst. Since platinum is substantially uniformly dispersed throughout the catalyst, the loading weight of the platinum value on the catalyst outer surface contributing to the primary reaction is believed to be significantly lower than in the present invention. Of course, the platinum loading weight of the catalyst is not determined in relation to the rate of deterioration of catalyst.

Japanese Patent Application Kokai No. 54-1289 describes in Examples 1, 2, and 3 the loading weights of platinum of 1, 0.8, and 0.7 grams/liter among other noble metals on an aluminum carrier. The noble metal loading weight is presumed to be about 0.068, 0.77, and 0.067 mg per square centimeter of apparent outer surface area of catalyst in Examples 1, 2, and 3, respectively. Of course, the noble metal loading weight of the catalyst is not determined in relation to the rate of deterioration of catalyst.

The noble metal loading weight of the conventional CO oxidizing catalysts for sintering furnace exhaust gases is not at all determined in consideration of the rate of deterioration of catalyst which plays a great role in the process. Most of the noble metal loading weights described in these references, particularly the loading weights of the noble metal value present on the catalyst outer surface contributing to the primary reaction are significantly lower than in the present invention.

Loading of noble metal in such low weight is closely related to the initial activity of catalyst. When only the initial activity of catalyst is considered, noble metals such as platinum exhibit such a high oxidative activity that a sufficient initial activity is obtained with a small amount of noble metal added at the reaction temperature range of at least 300° C. in the primary process as demonstrated in the following examples and other references to be listed hereinafter.

Shown below are noble metal loading weights in automobile emission catalysts in the prior art.

Automobile Technology, Vol. 35, No. 10 (1981), pages 1172-1176 describes low noble metal loading weights of 1.0 to 1.5 grams/liter for pellet catalysts (which presumably corresponds to 0.18 to 0.27% by weight and 0.10 to 0.15 mg per square centimeter of apparent outer surface area of catalyst) and 1.5 to 2.0 grams/liter for honeycomb catalysts (which presumably corresponds to 0.25 to 0.40% by weight and 0.068 to 0.091 mg per square centimeter of apparent outer surface area of catalyst). The present invention is significantly different from these automobile emission catalysts in the prior art in that the platinum loading weight of the honeycomb catalyst of the present invention is at least 2.4 grams/liter, and hence, at least 0.48% by weight or at least 0.20 mg per square centimeter of apparent outer surface area of catalyst.

Another example of automobile emission catalyst is disclosed in Japanese Patent Application Kokai No. 50-95188 as comprising a honeycomb structure carrier of cordierite which is coated with gamma-alumina and then impregnated with platinum and rhodium. It is described that Examples 1, 2, and 3 use noble metal loading weights of 0.54, 0.20, and 0.58% by weight, respectively, from which platinum loading weights of 0.42, 0.19, and 0.45% by weight of platinum are estimated.

In these conventional catalysts, no atttention has been paid to the relationship of noble metal loading weight to deterioration rate of a catalyst during sintering furnace exhaust gas treatment. The noble metal loading weight is set in consideration of the initial activity of catalyst. For this reason, the conventional catalysts have a lower noble metal loading than the catalyst of the present invention. When exhaust gases from a sintering furnace are treated with the conventional catalyst having such a low noble metal loading, neither reduction of the frequency of catalyst regeneration nor reduction in the thickness of a catalyst layer attributable to a retarded rate of deterioration is possible, and hence no reduction in power consumption is expectable.

SUMMARY OF THE INVENTION

It is, therefore, an object of the present invention to provide a novel and improved process for oxidizing carbon monoxide in exhaust gas using a catalyst which may be regenerated less frequently during continuous gas treating operation and thus contribute to less power consumption.

The present invention is directed to a process for oxidizing carbon monoxide present in exhaust gases at low concentrations, comprising a honeycomb structured carrier of cordierite carrying at least one active ingredient thereon. According to the present invention, the active ingredient is comprised of platinum in a loading weight of at least 0.20 mg per square centimeter of the apparent outer surface area of the catalyst.

DETAILED DESCRIPTION OF THE INVENTION

Figure 1:
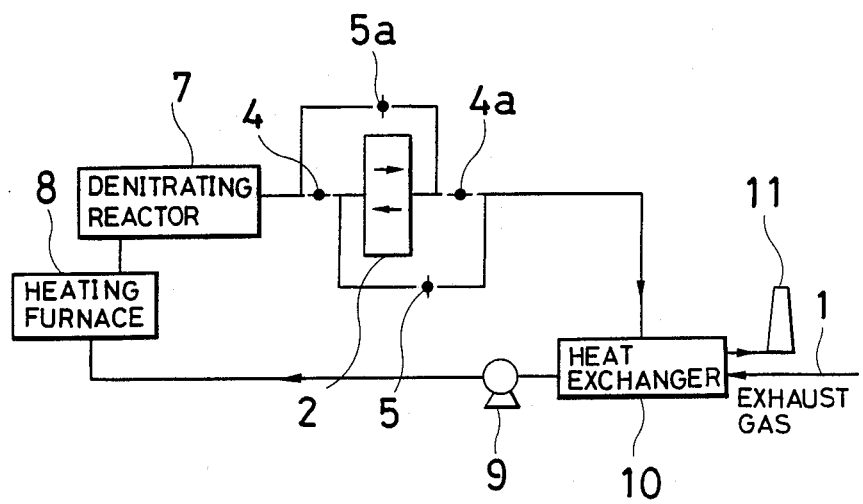
FIGS. 1 and 2 are block diagrams showing the advanced catalyst regenerating systems according to the present invention.
Figure 2:
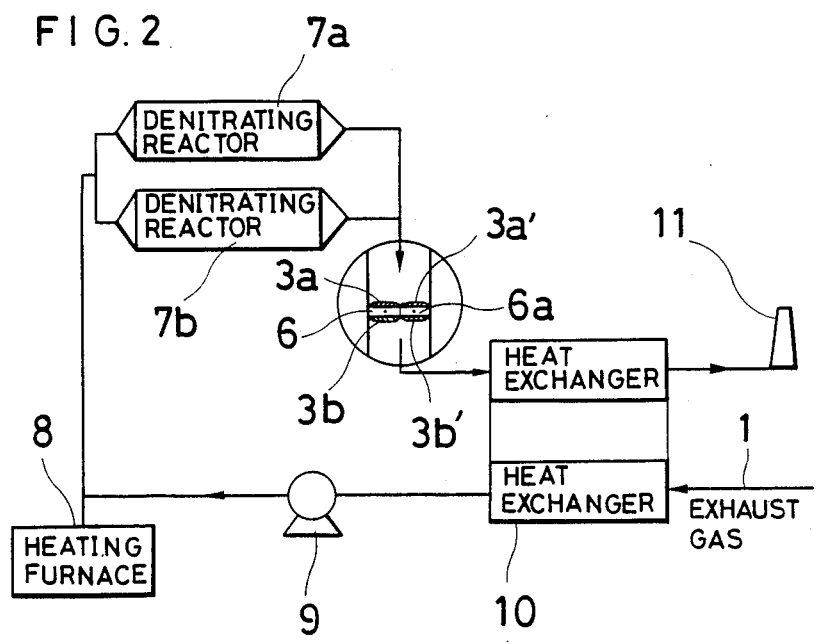

The present invention is directed to an improvement in the advanced catalyst regenerating systems according to our preceding patent applications, Japanese Patent Application Nos. 59-135188 and 59-93773, and intended for reduced frequency of catalyst regeneration operation and a further reduction in power consumption.

As described in the preamble, most catalysts for oxidizing carbon monoxide in exhaust gas from a sintering furnace are those having a noble metal loading weight of about 0.01 to about 0.8% by weight and hence, about 0.04 to about 0.3 mg per square centimeter of the apparent outer surface area of catalyst. When a layer of honeycomb structured catalyst having a platinum loading weight of 0.4% by weight or 0.16 mg/cm$^2$ of the apparent outer surface area of catalyst is operated at a gas temperature at a catalyst layer inlet of 390° C. and a gas space velocity of 180,000 hr$^{-1}$, the catalyst layer or the gas flow direction must be reversed once an hour. A pressure loss across the catalyst layer of 65 mmH$_2$O develops at the same space velocity and a gas superficial velocity in a column of 4.9 Nm$^3$/sec. (N: normal).

Making a series of experiments, we have discovered a certain relationship between gas space velocity and deterioration rate. At the same gas temperature at a catalyst layer inlet, the rate of deterioration of a catalyst is reduced with the diminishing gas space velocity. The gas space velocity can be diminished only by increasing the amount of catalyst material relative to the given flow rate of exhaust gas, leading to an increased catalyst cost and an increased pressure loss across the catalyst layer contributing to an increased power consumption. The quantity of power consumed by the blower largely depends upon the pressure loss across the catalyst layer. With certain catalyst layer pressure losses, an increase in energy required due to an increased blower power consumption would sometimes exceed the amount of energy saved due to recovery of CO oxidation heat. It is thus strongly desired to reduce the amount of catalyst material.

It is believed that the rate of deterioration of a catalyst is retarded by lowering the gas space velocity because despite substantial adsorption of poisons on the catalyst surface, active sites for CO oxidation reaction still remain available on the catalyst surface.

The rate of deterioration of a platinum-carrying catalyst was determined by increasing the platinum loading weight above the level of the conventional catalyst. It has been found that the rate of deterioration of catalyst is dramatically reduced by increasing the platinum loading weight twice that of the conventional catalyst. It has also been found that a further increase in platinum loading weight affords no additional effect, and the platinum loading weight gives little influence on the initial activity for CO oxidation within the platinum loading range and the gas space velocity used in the experiment.

By controlling the platinum loading weight within a specific range, the rate of deterioration of a catalyst can be dramatically retarded to reduce the frequency of catalyst regeneration as compared with the conventional catalyst while maintaining a satisfactory percent CO oxidation. Differently stated, when the catalyst is regenerated at the same frequency as the conventional catalyst, the increased platinum loading weight can reduce the amount of catalyst material to eventually reduce the power consumption of the blower. Moreover, control of the platinum loading weight within the specific range according to the present invention can meet both the requirements, a reduction in catalyst regeneration frequency and a reduction in power consumption of the blower as compared with the conventional catalyst.

Figure 3:
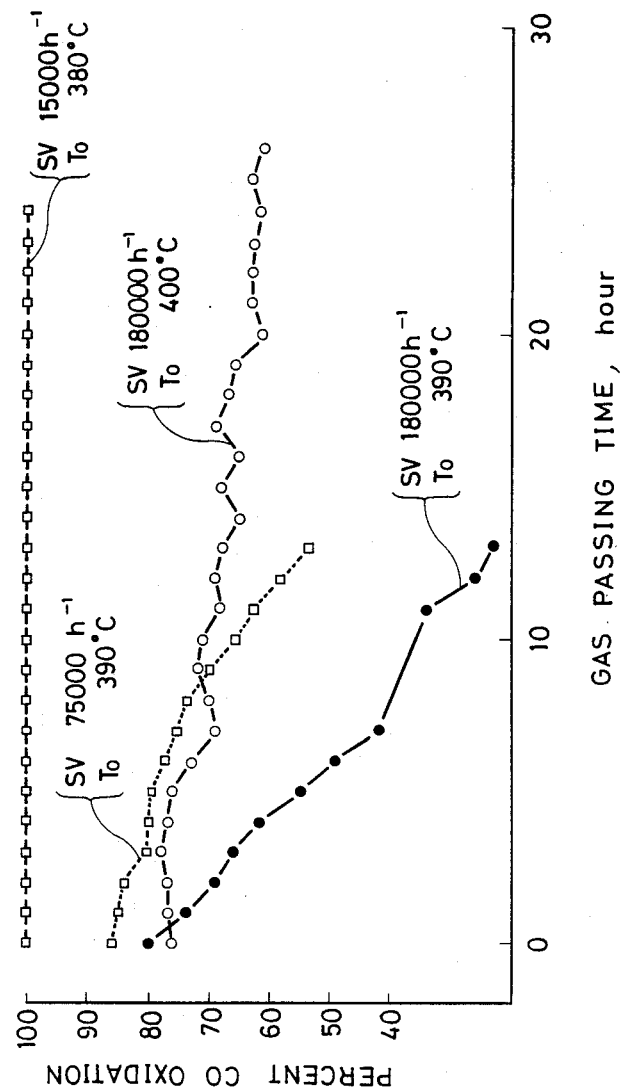
FIG. 3 is a diagram graphically showing a change with time of percent CO oxidation of a conventional catalyst having a platinum loading weight of 0.16 mg/cm$^2$.

FIG. 3 graphically illustrates a change with time of the percent CO oxidation of a conventional catalyst during treatment of exhaust gas from a sintering furnace, the catalyst having a platinum loading weight of 0.16 mg/cm$^2$. It is to be noted that all platinum loading weights referred to in the specification, table and drawings are platinum loading weights per square centimeter of the apparent outer surface area of catalyst as measured in mg/cm$^2$. A series of experiments were made. First runs were operated at a gas space velocity SV of 180,000 hr$^{-1}$, but at two different catalyst layer inlet gas temperatures $T_0$ of 390° and 400° C. As seen from the curves indicative of these runs at an SV of 180,000 hr$^{-1}$, a difference of 10° C. in catalyst layer inlet gas temperature at a temperature level around 400° C. brings on a considerable difference in reduction of percent CO oxidation or reversible deterioration of the catalyst. The lapse of time until the percent CO oxidation is lowered 5% (to be simply referred to as 5% deterioration time, hereinafter), which is important in actual application, is one hour at a catalyst layer inlet gas temperature $T_0$ of 390° C. and a gas space velocity SV of 180,000 hr$^{-1}$ and seven hours at $T_0$ of 400° C. and SV of 180,000 hr$^{-1}$. At every point of this 5% deterioration time, it is required that the gas flow direction be reversed or the catalyst layer be changed over.

In order to determine how the catalyst deterioration rate changes with the gas space velocity, an experiment was continued at a reduced gas space velocity, that is, at a catalyst layer inlet gas temperature $T_0$ of 390° C. and a gas space velocity SV of 75,000 hr$^{-1}$ and at $T_0$ of 380° C. and SV of 15,000 hr$^{-1}$. The results are also shown in FIG. 3. It is evident from the curves that an approximately one-half reduction of gas space velocity from 180,000 hr$^{-1}$ to 75,000 hr$^{-1}$ at a catalyst layer inlet gas temperature $T_0$ of 390° C. results in a substantially retarded deterioration rate. The deterioration tendency is substantially eliminated by extremely reducing the gas space velocity to 15,000 hr$^{-1}$ even at a catalyst layer inlet gas temperature $T_0$ of 380° C. The latter run suggests that despite noticeable adsorption of poisons on the catalyst surface, active sites for CO oxidation reaction still remain available for the given gas flow on the catalyst surface.

As understood from these results, the deterioration rate can be retarded by lowering the gas space velocity or increasing the amount of catalyst charged. However, the increased catalyst charge is unacceptable in practice because it undesirably increases the pressure loss across the catalyst layer, eventually increasing the power consumption of the blower.

Figure 4:
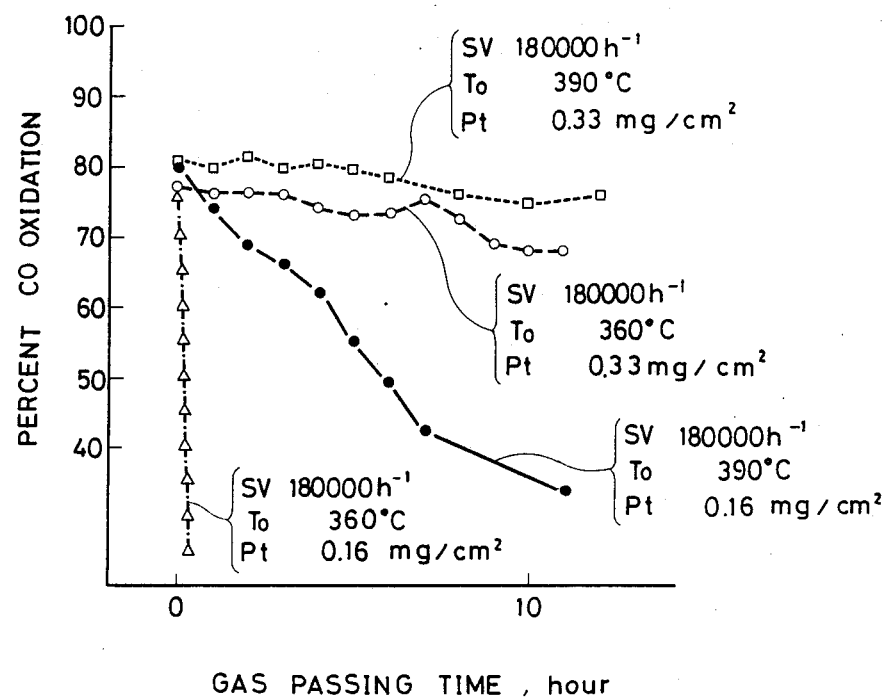
FIGS. 4 through 7 are diagrams graphically showing a change with time of percent CO oxidation of catalysts having varying platinum loading weights.

The weight of platinum loaded on a catalyst was increased in order to increase the number of active sites on the catalyst and the relationship of platinum loading weight to deterioration rate was examined. The results are shown in FIG. 4 along with the results with the conventional catalyst having a platinum loading weight of 0.16 mg/cm$^2$. A pair of curves corresponding to the runs at a catalyst layer inlet gas temperature $T_0$ of 390° C. show that increasing the platinum loading weight from 0.16 mg/cm$^2$ typical of the conventional catalyst to 0.33 mg/cm$^2$ significantly retards the deterioration rate of catalyst during treatment of sintering furnace exhaust gas. The effect due to an increase in platinum loading weight is also obtained in that no rapid deterioration occurs even when the catalyst layer inlet gas temperature is appreciably lowered to 360° C. (see another pair of curves in FIG. 4).

Figure 8:
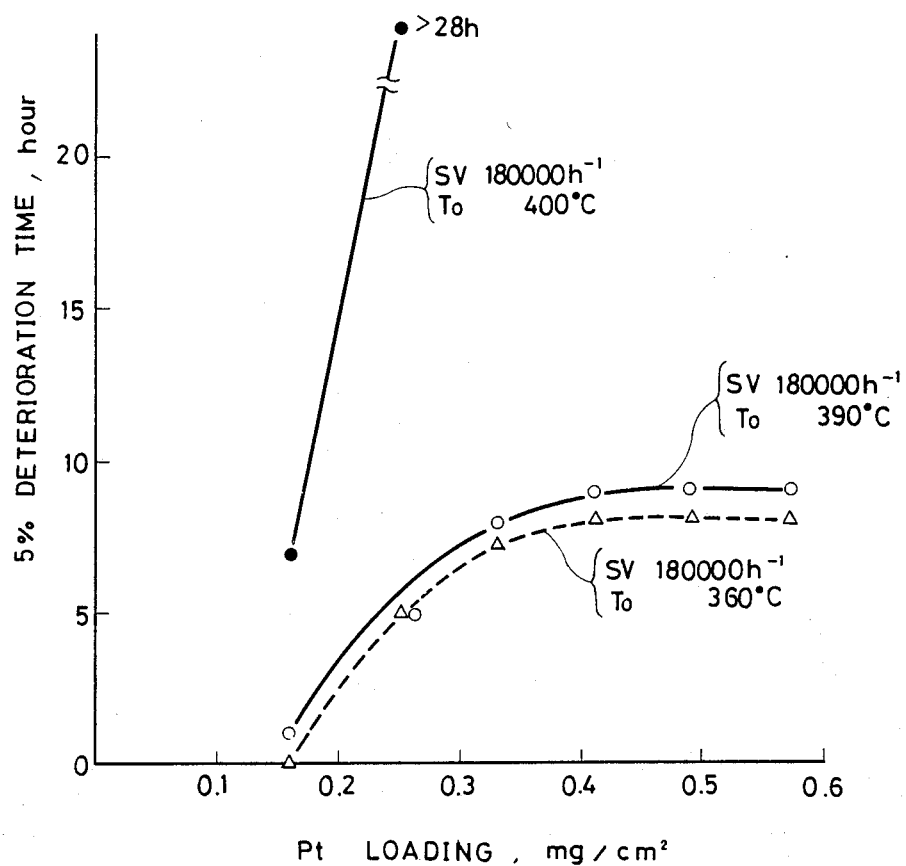
FIG. 8 is a diagram graphically showing the deterioration time of catalysts as a function of platinum loading weight.

As it became evident that the platinum loading weight greatly affects the deterioration rate of catalyst, a further experiment was performed with varying platinum loading weights. The results are shown in FIG. 8. It was demonstrated that platinum loading weights of at least 0.20 mg/cm$^2$ provide a 5% deterioration time of about 2½ hours at a high space velocity (180,000 hr$^{-1}$) or a reduced catalyst charge and even at a relatively low catalyst layer inlet temperature (360° C.). A catalyst reversal cycle of about 2½ hours is sufficient to allow for practical operation.

An increased platinum loading weight of 0.20 mg/cm$^2$ or more can render the operation practically acceptable while reducing the catalyst charge, which results in a reduced power consumption.

Even when the CO concentration of exhaust gas to be treated becomes low or the catalyst layer inlet gas temperature becomes low for some reasons in temperature balance in the system, operation can be continued without raising the catalyst layer inlet gas temperature by additional heating with a burner. With platinum loading weights of less than 0.20 mg/cm$^2$, the 5% deterioration time of catalyst shows a sudden drop and the frequency of catalyst regeneration is drastically increased particularly at a catalyst layer inlet gas temperature of 390° C. or lower, rendering the operation impossible.

The preferred platinum loading weight ranges from 0.24 to 0.45 mg/cm$^2$. Even for operation at a relatively low temperature of 360° C., platinum loading weights of 0.24 mg/cm$^2$ or more can maintain the percent CO oxidation above 50% after 10 hours of operation as seen from FIG. 7 and offer a 5% deterioration time of about 5 hours or longer as seen from FIG. 8, ensuring less frequent catalyst reversal cycles and higher operation efficiency. When the platinum loading weight exceeds 0.45 mg/cm$^2$, little change is only observed in rate of deterioration, and the initial activity for CO oxidation is little changed with such an increase in platinum loading weight.

EXAMPLES

In order that those skilled in the art will better understand how to practice the present invention, examples are given below along with comparative examples. These examples are presented by way of illustration and not by way of limitation.

EXAMPLE 1

A CO oxidation catalyst test equipment was connected to an actual industrial sintering furnace to carry out a durability test on a catalyst with an actual exhaust gas. The reactor used was a box type container which was charged with a honeycomb structured catalyst having a cross-sectional area of 13 square centimeters of such a thickness as to provide a predetermined gas space velocity SV of 180,000 hr$^{-1}$. The exhaust gas was passed at a flow rate of 360 Nm$^3$/hr and the temperature of the gas at an inlet of the catalyst layer was regulated by means of an electric heater placed at the inlet of the reactor. The test conditions are shown in Table 1.

A honeycomb structured cordierite carrier catalyst having platinum loaded in a weight of 0.33 mg/cm$^2$ was subjected to a catalyst durability test by passing the sintering furnace exhaust gas at a gas space velocity of 180,000 hr$^{-1}$ and a catalyst layer inlet gas temperature of 390° C. The results are shown in FIG. 4.

Under these conditions, the catalyst had a 5% deterioration time of about 8 hours.

COMPARATIVE EXAMPLE 1

The catalyst durability test was repeated by the same procedure as in Example 1 except that a honeycomb structured cordierite carrier catalyst having platinum loaded in a weight of 0.16 mg/cm$^2$ which was a commonly used catalyst was used. The results are shown in FIG. 4.

Under these conditions, the catalyst had a 5% deterioration time of about 1 hour and thus demonstrated a significantly higher rate of deterioration than that of Example 1. The significant effectiveness of the catalyst of Example 1 is proved.

EXAMPLE 2

The catalyst durability test was repeated by the same procedure as in Example 1 except that the catalyst layer inlet gas temperature was 360° C. The results are also shown in FIG. 4.

COMPARATIVE EXAMPLE 2

The catalyst durability test was repeated by the same procedure as in Example 2 except that a honeycomb structured cordierite carrier catalyst having platinum loaded in a weight of 0.16 mg/cm$^2$ which was a commonly used catalyst was used. The results are also shown in FIG. 4.

Under these conditions, the catalyst had a 5% deterioration time of about 5 minutes and thus demonstrated a significantly higher rate of deterioration than that of Example 2. The significant effectiveness of the catalyst of Example 2 is proved.

The results of Example 2 and Comparative Example 2 reveal that for the operation at a catalyst layer inlet gas temperature of 360° C. and a gas space velocity SV of 180,000 hr$^{-1}$, the conventional catalyst (platinum loading 0.16 mg/cm$^2$) had a 5% deterioration time of about 5 minutes whereas increasing the platinum loading to 0.33 mg/cm$^2$ permitted the operation to be continued for about 8 hours without any reversal.

EXAMPLE 3

Figure 5:
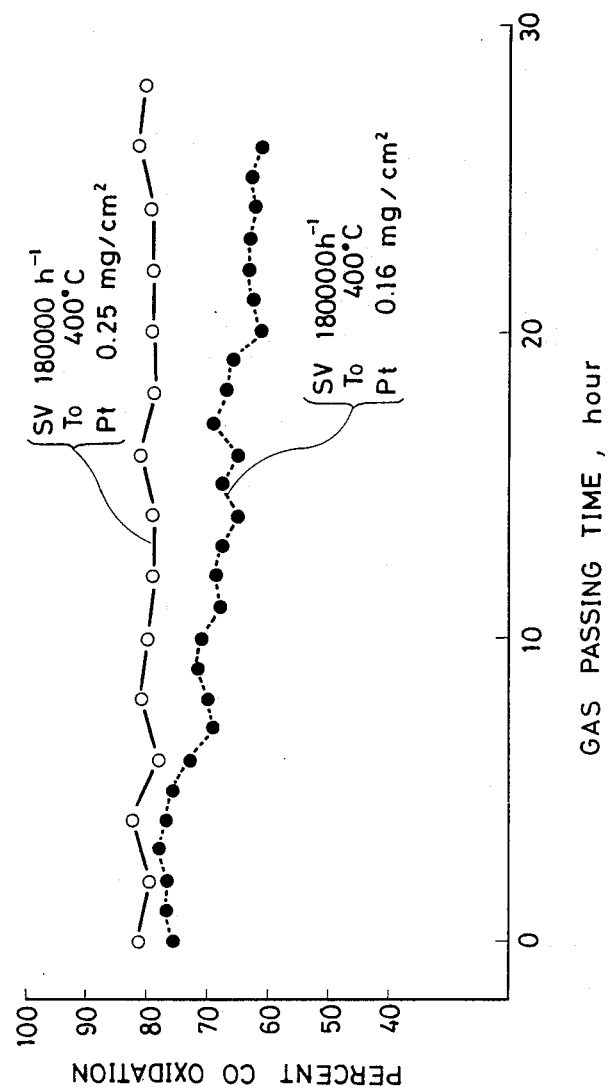

The catalyst durability test was repeated by the same procedure as in Example 1 except that the exhaust gas was passed through a honeycomb structured cordierite carrier catalyst having platinum loaded in a weight of 0.25 mg/cm$^2$ at a gas space velocity SV of 180,000 hr$^{-1}$ and a catalyst layer inlet gas temperature of 400° C. The results are shown in FIG. 5.

No deterioration was observed throughout the overall test period of 28 hours.

COMPARATIVE EXAMPLE 3

The catalyst durability test was repeated by the same procedure as in Example 3 except that a honeycomb structured cordierite carrier catalyst having platinum loaded in a weight of 0.16 mg/cm$^2$ was used. The results are shown in FIG. 5.

Under these conditions, the catalyst had a 5% deterioration time of about 7 hours and thus demonstrated a significantly higher rate of deterioration than that of Example 3. The significant effectiveness of the catalyst of Example 3 is proved.

EXAMPLES 4–7

Figure 6:
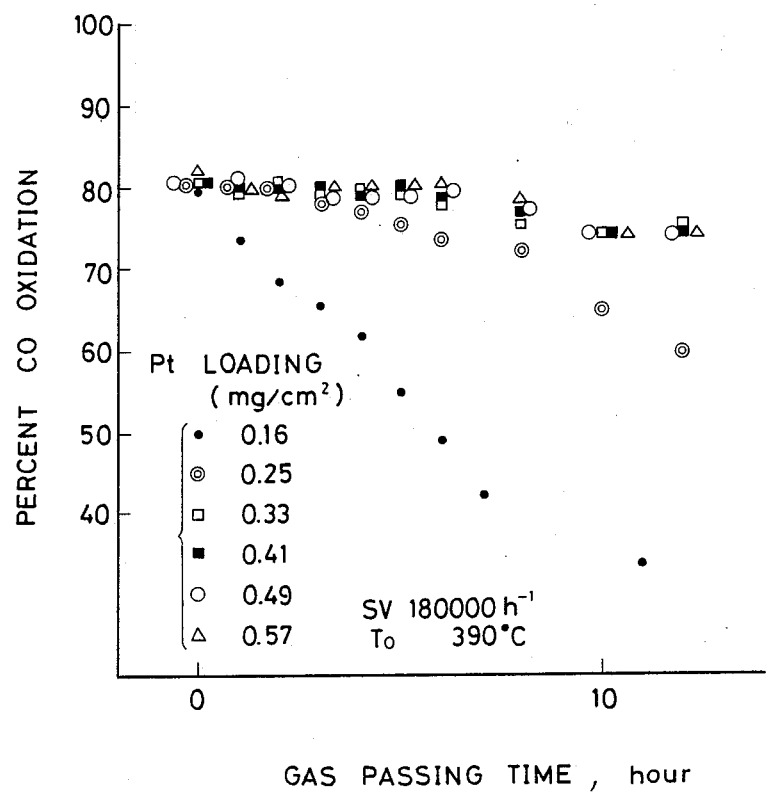

The catalyst durability test was repeated by the same procedure as in Example 1 except that honeycomb structured cordierite carrier catalysts having platinum loaded in a weight of 0.25 mg/cm$^2$, 0.41 mg/cm$^2$, 0.49 mg/cm$^2$, and 0.57 mg/cm$^2$ were used. The results are shown in FIG. 6 along with the results of Example 1 and Comparative Example 1 conducted with platinum loading weights of 0.33 mg/cm$^2$ and 0.16 mg/cm$^2$ at a gas space velocity SV of 180,000 hr$^{-1}$ and a catalyst layer inlet gas temperature $T_0$ of 390° C.

Up to the platinum loading of 0.49 mg/cm$^2$, the more the platinum loading, the more effectively the rate of deterioration of catalyst was retarded. No additional effect was observed by increasing the platinum loading above this level.

EXAMPLES 8–11

Figure 7:
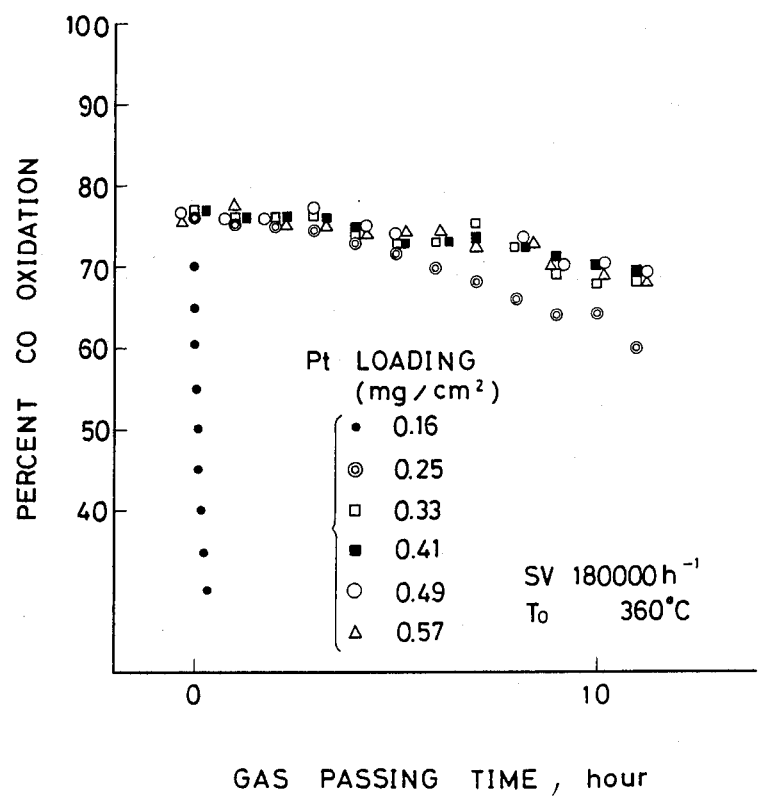

The catalyst durability test was repeated by the same procedure as in Example 2 except that honeycomb structured cordierite carrier catalysts having platinum loaded in a weight of 0.25 mg/cm$^2$, 0.41 mg/cm$^2$, 0.49 mg/cm$^2$, and 0.57 mg/cm$^2$ were used. The results are shown in FIG. 7 along with the results of Example 2 and Comparative Example 2 conducted with platinum loading weights of 0.33 mg/cm$^2$ and 0.16 mg/cm$^2$ at a gas space velocity SV of 180,000 hr$^{-1}$ and a catalyst layer inlet gas temperature $T_0$ of 360° C.

Up to the platinum loading of 0.49 mg/cm$^2$, increasing the platinum loading weight was effective in retarding the rate of deterioration of catalyst. No additional effect was observed by increasing the platinum loading above this level.

The rate of deterioration of CO oxidizing catalysts with which exhaust gas from a sintering furnace was treated can be significantly retarded by increasing their platinum loading above the known platinum loading level of commonly used catalysts. It thus becomes possible to reduce the frequency of catalyst regeneration and/or to reduce the amount of catalyst material charged to save the power consumption of the associated blower. It was also confirmed that no further effect is available by increasing the platinum loading weight above a certain upper limit at the sacrifice of economy. These are also evident from the curves in FIG. 8 which illustrates the results of all the foregoing examples and comparative examples.

Figure 9:
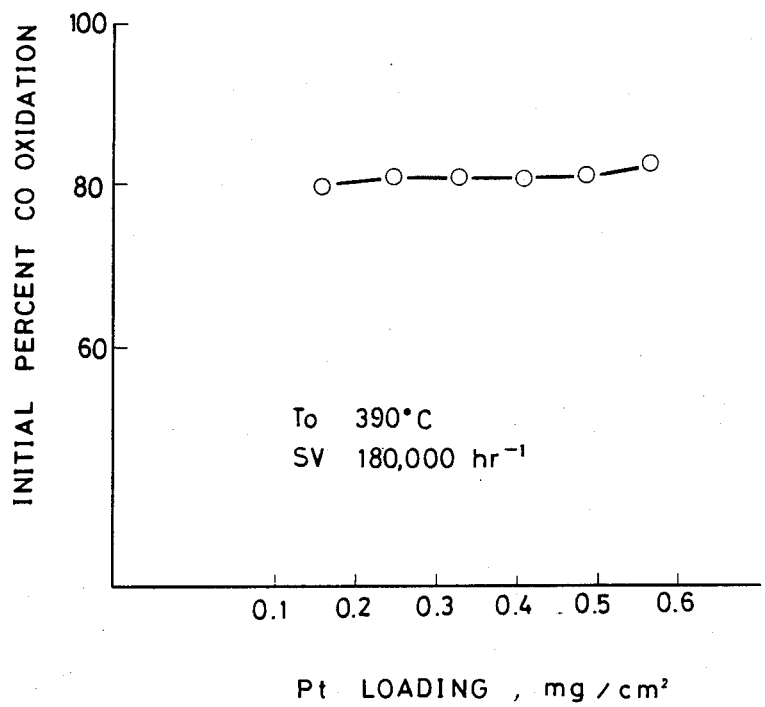
FIG. 9 is a diagram graphically showing the initial activity of CO oxidizing catalysts having various platinum loading weights.

With respect to its upper limit, the platinum loading weight is closely related to the initial CO oxidation rate. In FIG. 9, the initial percent CO oxidation, that is, initial activity of catalysts in % is plotted as a function of their platinum loading in mg/cm$^2$. It is understood that an increased platinum loading weight can significantly retard the rate of deterioration of catalyst, but give little influence on the initial activity.

The conditions used in the foregoing experiments on catalysts with varying platinum loading weight are tabulated in Table 1.

TABLE 1

| Experiment No. | | Platinum loading weight of catalyst, Pt (mg/cm$^2$) | Gas temperature at catalyst layer inlet $T_0$ (°C.) |
|---|---|---|---|
| 1 | (Example 1) | 0.33 | 390 |
| 2 | (Comparative Example 1) | 0.16 | 390 |
| 3 | (Example 2) | 0.33 | 360 |
| 4 | (Comparative Example 2) | 0.16 | 360 |
| 5 | (Example 3) | 0.25 | 400 |
| 6 | (Comparative Example 3) | 0.16 | 400 |
| 7 | (Example 4) | 0.25 | 390 |
| 8 | (Example 5) | 0.41 | 390 |
| 9 | (Example 6) | 0.49 | 390 |
| 10 | (Example 7) | 0.57 | 390 |
| 11 | (Example 8) | 0.25 | 360 |
| 12 | (Example 9) | 0.41 | 360 |
| 13 | (Example 10) | 0.49 | 360 |
| 14 | (Example 11) | 0.57 | 360 |

In the process of oxidizing carbon monoxide in exhaust gas from a sintering furnace, those catalysts having a commonly used well known platinum loading weight offered a good initial activity, but underwent relatively fast deterioration under sintering furnace exhaust gas conditions and thus required frequent regeneration. The power consumption of an associated blower was not negligible because of a pressure loss across the catalyst layer.

As demonstrated by the results of a series of experiments, the catalysts of the present invention having a platinum loading weight increased over the commmponly used level exhibit significantly retarded deterioration. Consequently, the frequency of catalyst regeneration is decreased or the amount of catalyst material charged is reduced to further reduce the power consumption of the blower.

Also, the catalysts of the present invention can achieve both a reduction in catalyst regeneration frequency and a reduction in blower power consumption as compared with the conventional catalysts.

We claim:

1. A method of oxidizing carbon monoxide present in sintering furnace-exhaust gases containing carbon monoxide comprising the steps of desulfurizing and denitrating the exhaust gases from the sintering furnace; and oxidizing the carbon monoxide contained in the desulfurized/denitrated exhaust gases by contacting said exhaust gases with a catalyst comprising a honeycomb structured carrier of cordierite carrying at least one active ingredient thereon, said active ingredient being comprised of platinum at a loading weight of at least 0.20 mg/cm$^2$ of the apparent outer surface area of the catalyst, at a catalyst inlet temperature of at least 300° C.

2. A process as claimed in claim 1, wherein the platinum loading weight is from 0.24 to 0.45 mg/cm$^2$.

* * * * *